Patented Mar. 20, 1951

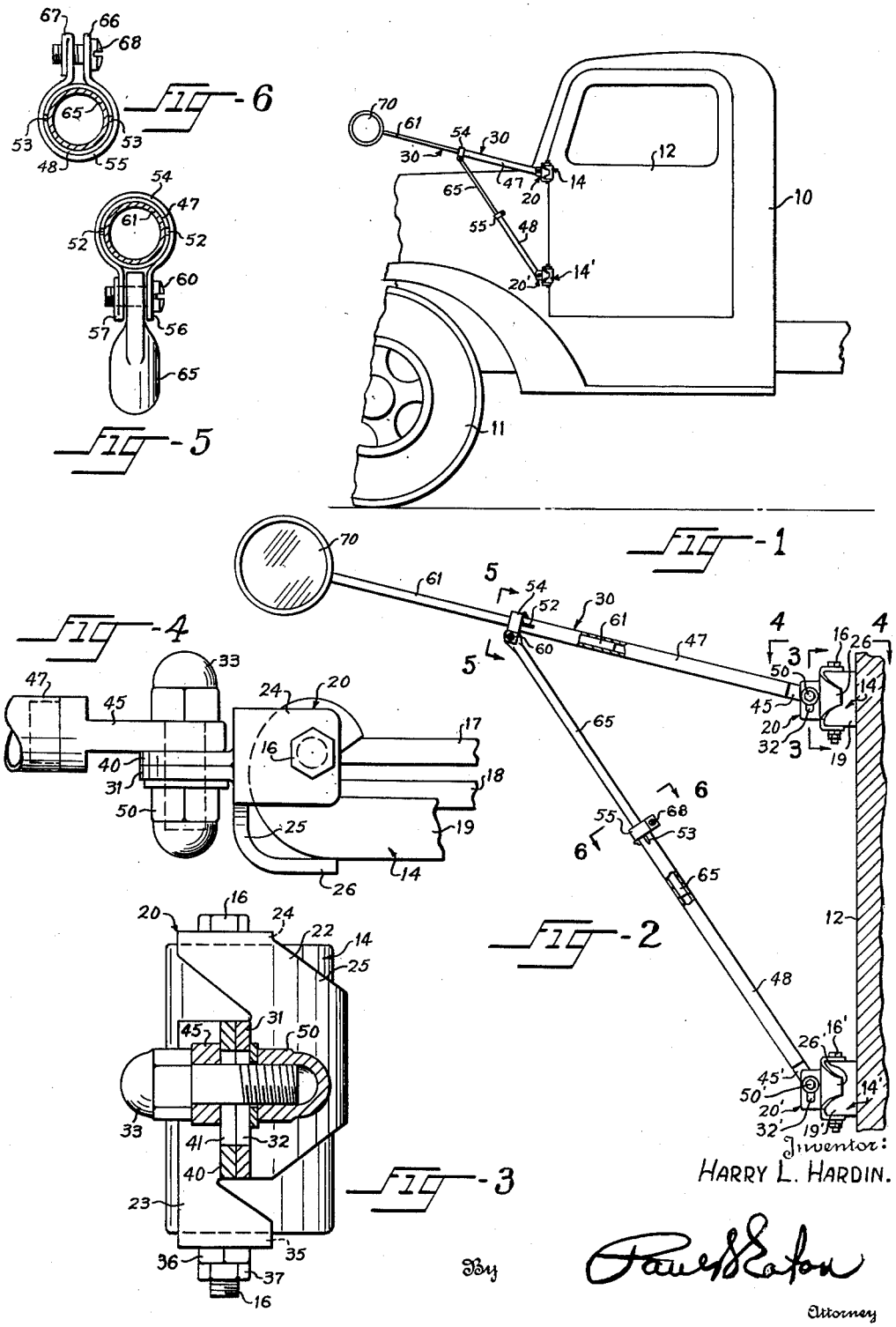

2,545,777

UNITED STATES PATENT OFFICE 2,545,777

SUPPORT FOR REARVIEW MIRRORS

Harry L. Hardin, Charlotte, N. C.

Application August 4, 1948, Serial No. 42,500

2 Claims. (Cl. 248—279)

1

This invention relates to an improved means for mounting a rear view mirror on the door hinges of an automotive vehicle, such as a tractor of a type such as used to pull large commercial wheeled trailers and semi-trailers.

It is an object of this invention to provide a frame for mounting an extension type rear view mirror thereon, which is adapted to be swingably mounted on the hinge pins of the conventional door hinges of an automotive tractor and this frame has ears integral therewith which are adapted to engage the rear surface of the door hinge when the mirror support frame is swung outwardly at right angles to the door of the tractor and whereby the mirror is thus prevented from swinging rearwardly at its outer end after it has been swung to this position, and, on the other hand, the frame may be swung forwardly at its outer end for passing through narrow alleys and narrow streets, as is often necessary.

It is another object of this invention to provide a rear view mirror support of the type described having adjustable clips on the inner end thereof which may be adjusted to accommodate various sizes of door hinges for mounting the support on the door hinges.

Great difficulty has heretofore been experienced by tractor-truck drivers on account of vibration of the exteriorly mounted rear view mirror to such an extent as to mar the rear view of the driver, due largely to improper support for the mirror. It is therefore another object of the invention to provide two spaced supports for the mirror, and by using the two hinges of the door of the cab, the mirror support can be quickly attached and detached from the door, since the two door hinge pins can be employed also for supporting the rear view mirror assembly.

Some of the objects of the invention having been stated, other objects will appear as the description proceeds, when taken in connection with the accompanying drawings, in which Figure 1 is an elevation of the central portion of an automotive tractor showing the invention mounted thereon and extending forwardly so as to pass through an alley;

Figure 2 is an enlarged elevation of the rear view mirror support shown in Figure 1, but showing the support swung outwardly at right angles to the door of the tractor;

Figure 3 is an enlarged elevation, with parts in section and being taken substantially along the line 3—3 in Figure 2;

Figure 4 is an enlarged plan view taken along the line 4—4 in Figure 2;

2

Figure 5 is an enlarged vertical sectional view taken along the line 5—5 in Figure 2;

Figure 6 is an enlarged transverse sectional view taken along the line 6—6 in Figure 2.

Referring more specifically to the drawings, the numeral 10 indicates the cab of an automotive tractor, one of the ground wheels of which is shown at 11. The cab 10 has a door 12 which is hingedly secured to the cab 10 by upper and lower hinges 14 and 14', respectively, having hinge bolts 16 and 16', respectively, therein. Each hinge comprises a conventional ear 17 secured to the frame, and an ear 18 secured to the front edge of the door and secured together by hinge pins 16 and 16' and a covering member 19 also secured to the door and covering the pivot points of the hinges. The hinge pins 16 and 16' slidably penetrate support brackets broadly designated at 20 and 20', respectively. Both of the support brackets 20 and 20' being identical, like reference characters will apply to the lower bracket as apply to the upper bracket with the prime notation added.

The hinge bracket 20 comprises an upper clip 22 and a lower clip 23. The upper clip 22 is bent inwardly to form a horizontally disposed ear 24 which is slidably penetrated by the bolt 16 and engages the top surface of the hinge 14. The upper clip 22 has a portion 25 integral therewith which extends outwardly, to the right in Figure 3, and is bent at right angles to form a vertically disposed ear 26, the surface nearest the hinge pin being adapted to engage the rear surface of the hinge 14 when the mirror support bracket frame, broadly designated at 30, is disposed at right angles to the door 12. The upper clip 22 also has an outwardly projecting portion 31 integral therewith having a vertically disposed adjustment slot 32 therein, which is adapted to be slidably penetrated by a bolt 33.

The lower clip 23 has an inwardly projecting ear 35 which is also penetrated by the hinge bolt 16 and engages the bottom surface of the associated hinge 14. The bottom surface of the inwardly projecting ear 35 is engaged by a lock nut 36 having another lock nut engaging the lower surface thereof, the lock nuts being threadably mounted on the lower end of the bolt 16. The lower clip 23 also has an outwardly projecting portion 40 integral therewith having a vertically disposed adjustment slot 41 therein which is also slidably penetrated by the bolt 33.

Mounted on the bolts 33 and 33' associated with the support brackets 20 and 20' are blocks 45 and 45' respectively, on the outer ends of which tubular shafts 47 and 48, respectively, of the mirror support frame 30 are secured, as by a pressed fit. It is thus seen that the tubular shafts 47 and 48 are secured to the brackets 20 and 20' by the bolts 33 and 33' which penetrate the slots 41 and 32 and 41' and 32' in the clips 23 and 22 and 23' and 22' of the support brackets 20 and 20', respectively, and these bolts 33 and 33' have suitable nuts 50 and 50' thereon to thus secure the hinge clips 20 and 20' to the respective blocks 45 and 45'.

The outer ends of the tubular shafts 47 and 48 have respective longitudinally extending slots 52 and 53 therein which extend from the outer end thereof a substantial distance towards the inner ends thereof. There are clamps rings 54 and 55 mounted on the free ends of the tubular shafts 47 and 48, respectively, as by welding. The clamp ring 54 has downwardly projecting ears 56 and 57, the ear 57 being bent back upon itself and the ear 56 is slidably penetrated by a screw 60, the other end of which is threadably imbedded in the ear 57 to thus tighten the clamping ring 54 around the outer end of the shaft 47.

There is a tubular shaft 61 which is slidably mounted in the tubular shaft 47 and is adjustable relative to the tubular shaft 47 and is clamped in the desired position relative to the tubular member 47 by tightening the screw 60 in the clamp ring 54. The screw 60 also penetrates the flattened end of a rod 65 which extends downwardly, at an angle, and is slidably mounted in the tubular shaft 48. The clamping ring 55 (Figure 6) on the end of the shaft 48 has ears 66 and 67 integral therewith, which are identical to the respective ears 56 and 57 of the clamping ring 54 and the ear 66 is slidably penetrated by a screw 68, the other end of which is threadeably imbedded in the ear 67.

It is thus seen that by tightening the screw 68 on the clamp ring 55, the end of the shaft 48 is squeezed tightly around the rod 65 to thus lock the rod 65 in any desired position relative to the tubular shaft 48. A suitable mirror 70 is secured to the outer free end of the tubular shaft 61 by conventional means, not shown. In mounting the frame 30 on the hinges 14 and 14', the lock nut 36 is tightened against the inwardly projecting portion 35 of the hinge bracket clip 23 just enough so the head of the hinge bolt 16 and the nut 36 associated therewith will frictionally engage the remote surfaces of the ears 24 and 35, of the clips 22 and 23, respectively, to thereby allow the frame 30 to be moved, manually, to the position shown in Figure 1, that is so the frame 30 extends forwardly relative to the cab 10 and when the frame 30 is swung outwardly, at right angles to the cab 10, the ear 26 of the hinge clip 22 associated with the brackets 20 and 20' will engage the rear surfaces of the hinges 14 and 14' to thus prevent the outer end of the frame 30 from moving rearwardly farther than is desired when the tractor is in motion.

It is thus seen that a dual hinged supporting means has been provided for an exteriorly mounted rear view mirror for automotive vehicles, which not only overcomes vibration, but allows pivoting of the supporting means for passage of the vehicle through narrow spaces.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a mirror support for an automotive tractor, said tractor having a cab and a door hingedly mounted on the cab by upper and lower hinges having hinge bolts therein, a frame on which the mirror is mounted comprising a bracket mounted on the hinge bolts of each of the hinges, a tubular shaft secured at one end thereof to the lowermost bracket and having a rod slidably mounted therein and means on the tubular shaft for clamping the rod at any desired position relative to the tubular shaft, a second tubular shaft secured at one end thereof to the uppermost bracket, the second tubular shaft having a shaft slidably mounted therein on the free end of which is mounted a mirror, means on the second tubular shaft for clampingly securing the shaft on which the mirror is mounted in any desired position relative to the uppermost tubular shaft, and the rod being connected to the free end of the second tubular shaft to thereby vertically adjust the mirror relative to the door.

2. A rear view mirror support for a trailer-tractor, said trailer-tractor having a door supported by upper and lower hinges having hinge bolts therein, a frame comprising an upper and a lower tubular shaft, means for frictionally connecting the inner ends of the upper and lower tubular shafts to the upper and lower hinge pins, a connection between the lowermost tubular shaft and the uppermost tubular shaft for rigidily supporting the uppermost tubular shaft on a substantially horizontal plane, a shaft having one end adjustably mounted in the uppermost tubular shaft and having a mirror mounted on the other end thereof.

HARRY L. HARDIN.

REFERENCES CITED

The following references are of record in the file of this patent:

UNITED STATES PATENTS

| Number | Name | Date |
|---|---|---|
| 694,648 | Jordan et al. | Mar. 4, 1902 |
| 2,176,723 | Sauer | Oct. 17, 1939 |
| 2,393,056 | Noblitt et al. | Jan. 15, 1946 |
| 2,458,117 | Tolbert | Jan. 4, 1949 |